United States Patent Office 2,921,646
Patented Jan. 19, 1960

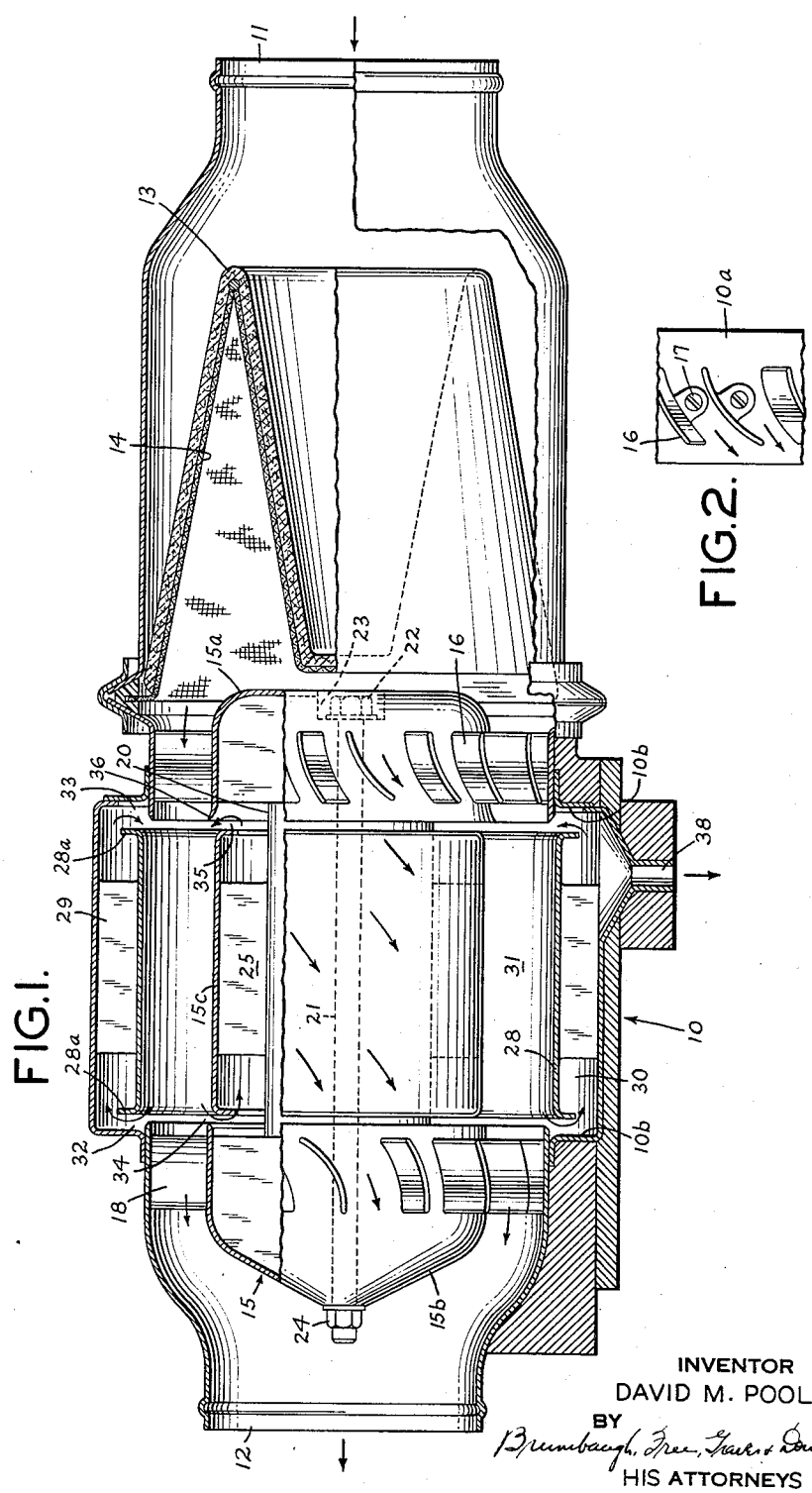

2,921,646
MOISTURE SEPARATOR

David M. Poole, Huntington, N.Y., assignor to Fairchild Engine and Airplane Corporation, Bay Shore, N.Y., a corporation of Maryland Application January 31, 1957, Serial No. 637,416

10 Claims. (Cl. 183—80)

This invention relates to apparatus for separating moisture from a gaseous fluid stream, and particularly to apparatus for separating very small particles of moisture from a gaseous fluid stream, such as light fog held in suspension in the gaseous stream.

In the apparatus of the present invention, the gaseous stream, in passing through a housing or conduit, encounters a moisture agglomerator which forms droplets of the moisture. A hollow island is located downstream of the moisture agglomerator, and as the stream approaches the island, a swirling motion is imparted to it, causing the stream to follow a helical path of travel around the island. As a result of this swirling motion, the droplets of moisture, being heavier than the gaseous fluid, are moved by centrifugal force outwardly into a moisture accumulating chamber which surrounds the island. At the downstream end of the island, the swirling stream, substantially free of moisture, is deflected to straighten out the flow and reconvert much of the rotational or swirling energy back into pressure head.

The unique design of the moisture separator of the present invention greatly assists in impelling the moisture droplets toward the moisture accumulating chamber which surrounds the island. More particularly, a countercurrent flow of a small part of the gaseous fluid stream is directed through the moisture accumulating chamber to help carry the droplets of moisture thereto. In addition, the island is formed with a return passage therethrough to provide a countercurrent flow of a small part of the fluid stream. The entrance to this passage is at the downstream end of the island, and the return passage communicates with an outlet opening at the upstream end of the island which extends continuously around the outer periphery of the island. As the countercurrent stream emerges outwardly through the outlet opening, droplets of moisture which tend to cling or adhere to the upstream end of the island are carried away from the surface of the island by the combined effect of the swirling stream and the stream emerging outwardly from the return passage through the island, so that these droplets of moisture are impelled in the direction of the moisture accumulating chamber.

For a more complete understanding of the present invention, reference may be had to the detailed description which follows and to the accompanying drawing in which:

Figure 1 is a view, partly in cross-section and with certain parts broken away, of the apparatus of the present invention; and Figure 2 is a fragmentary view of the vanes which impart a swirling motion to the fluid stream.

Referring to Figure 1 of the drawing, the moisture separator of the present invention comprises generally a housing, generally designated 10, having an inlet passage 11 at the upstream end thereof, and an outlet passage 12 at the downstream end thereof. A gaseous fluid stream, such as an air stream, having moisture in suspension, which may, for example, be in the form of light fog, enters through the inlet 11 and flows through a fine fiber, moisture agglomerating filter bag 13 made, for example, of fiberglass and supported on an annular wire screen 14. The outer perimeter of the screen 14 is affixed to the housing, and the outer portion of the screen tapers inwardly in an upstream direction while the central portion thereof reverses its direction and tapers inwardly in a downstream direction. The filter conforms to the shape of the screen so that it is readily placed thereon. With this arrangement, a large area of filter material is presented to the moving air stream. As the fine particles of moisture encounter the bag, the bag becomes saturated, with the result that the moisture particles are agglomerated or condensed on the fibers, forming larger particles or droplets. Under the force of the passing air, the droplets are blown off the fibers and pass with the air stream downstream of the filter.

A hollow, substantially cylindrical island, generally designated 15, is located within the housing 10 downstream of the moisture condensing filter 13. The hollow island 15 is made in three parts—an upstream end 15a, a downstream end 15b, and an intermediate section 15c. The upstream end 15a of the island is supported centrally within the housing by the inner edges of a circular array of air deflecting vanes 16 which are affixed by screws 17 (see Figure 2), or by other suitable means, to the inner wall 10a of the housing 10. The downstream end 15b of the island is supported centrally within the housing by the inner edges of a circular array of vanes 18 anchored to the inner wall of the housing in similar fashion to the vanes 16. The intermediate section 15c of the island is supported by the two end portions. More specifically, a cylindrical body 20 is supported centrally within and coaxially of the hollow island by a rod 21 which passes through the axis of the cylindrical body. The rod 21 has a head 22 which is accommodated within a recess 23 in the upstream end 15a of the island, and the opposite end of the rod 21 is threaded to receive a nut 24 thereon. The outer periphery of the cylindrical body 20 has radially and axially disposed fins 25 projecting therefrom, and the cylindrical section 15c of the island is affixed to the outer edges of these radially disposed fins 25.

An outer cylindrical wall 28 having outwardly turned edges 28a is accommodated within the housing surrounding and concentric with the outer surface of the cylindrical section 15c. The cylindrical wall 28 is held by radially and axially disposed fins 29 to the inner surface of the housing 10, which at that portion is of slightly increased diameter, forming a moisture accumulating chamber 30 outboard of the wall 28 between the outer surface of the wall and the inner surface of the housing.

After the moving air stream passes through the filter 13, it encounters the circular array of vanes 16 which impart a swirling or helical path of travel to the air stream as it passes through the annular passage 31 defined between the outer surface of the cylindrical section 15c and the inner surface of the cylindrical wall 28. The downstream ends of the vanes 16 are disposed at angles of approximately 60° to a path of travel through the annular passage 31 parallel to the axis thereof. Some of the moisture droplets formed by the moisture agglomerating filter adhere to the outer surface of the upstream end 15a of the island, but other droplets are carried with the moving air stream in a swirling motion through the passage 31. The droplets of moisture, being heavier than the air, are impelled outwardly by centrifugal force toward the inner surface of the cylindrical wall 28. These droplets will be moved along the surface of the wall 28 by the swirling air stream until they reach a gap or passage 32 defined between the downstream end of the wall 28 and the housing. A part of the air stream will pass through the gap 32 carrying droplets of moisture with it into the moisture accumulating chamber 30 which ultimately will be deposited in the trough defined between the upturned edges 28a of the cylindrical wall 28 or in the trough defined between the walls 10b of the housing 10. The air entering the moisture accumulating chamber 30, of course, reverses its direction, and this countercurrent stream ultimately returns to the annular passage through a gap or passage 33 defined between the upstream end of the cylindrical wall 28 and the housing, mixing with the swirling mass of air downstream of the vanes 16.

Another part of the swirling air stream enters through the gap 34 between the downstream end 15b of the island and the intermediate section 15c thereof. This countercurrent stream of air flows upstream through the passage formed between the outer surface of the cylindrical body 20 and the inner surface of the cylindrical wall of the intermediate section 15c of the island to the passage 35 defined between the intermediate section 15c and the upstream end 15a of the island. The gaps 34 and 35 are formed continuously around the circumference of the island. The air emerging from the gap 35 flows outwardly, rejoining the swirling stream of air flowing through the annular passage 31. Since the downstream end of the upstream portion 15a of the island is turned outwardly forming a lip 36, droplets which are formed on the outer surface of the upstream end 15a of the island and moved in a downstream direction by the force of the air stream will eventually leave the outer surface of the portion 15a assisted by the combined effect of the swirling air stream and the air passing outwardly through the gap 35. The outward momentum acquired by the droplets of moisture will move the droplets toward the surface of the wall 28 and ultimately, as explained above, into the moisture accumulating chamber 30 via the gap or passage 32 at the downstream end of the wall 28.

In the upper half of the moisture accumulating chamber 30, the outwardly turned ends 28a of the wall 28 serve as a trough for the collection of the moisture which flows by gravity into the trough formed between the walls 10b of the housing. The trough formed between the walls 10b of the housing collects the moisture in the lower half of the moisture accumulating chamber. Ultimately the moisture is discharged from the lower trough through the drain 38.

The major portion of the air stream will continue its swirling movement through the annular passage 31, coming into contact with the downstream vanes 18. The upstream ends of the vanes 18 extend at an angle of approximately 45° to the axial direction, and these vanes deflect and straighten out the air stream so that it emerges through the outward passage 12 in a substantially straight direction. Thus, the downstream vanes 18 reconvert much of the rotational energy of the air stream back into pressure head.

The invention has been shown in a single preferred form and by way of example only, and obviously many modifications and variations may be made therein without departing from the spirit of the invention. The invention, therefore, is not to be limited to any specified form or embodiment, except in so far as such limitations are set forth in the appended claims.

I claim:

1. A moisture separator comprising a housing having inlet and outlet passages for a moving gaseous fluid, a moisture agglomerating filter at the inlet passage to form droplets of moisture as the gaseous fluid passes through the filter, means forming an island downstream of the filter, an array of vanes surrounding the upstream end of the island for imparting a swirling motion to the gaseous fluid and to any droplets carried thereby, a wall within the housing and surrounding the means forming the island defining a passage therebetween for the swirling gaseous fluid stream, a moisture accumulating chamber defined within the housing outside of said wall which surrounds the means forming the island, an inlet from the annular passage to the moisture accumulating chamber, whereby the droplets of moisture are moved by centrifugal force outwardly of said annular passage into contact with the inner surface of said wall defining the moisture accumulating chamber and ultimately through said inlet into the moisture accumulating chamber, a passage within the means forming the island for a countercurrent flow of the fluid therethrough, a downstream entrance to said passage and an upstream outlet therefrom extending around the upstream end of the island through which the countercurrent stream of fluid emerges and rejoins the swirling fluid, the outward flow of fluid carrying droplets of moisture which adhere to the upstream end of the means forming the island outwardly from the island toward the moisture accumulating chamber.

2. A moisture separator as set forth in claim 1 including an array of vanes surrounding the downstream end of the means forming the island to straighten out the direction of flow of the swirling fluid.

3. A moisture separator as set forth in claim 1 including an outlet from the moisture accumulating chamber to the annular passage upstream of the said inlet, whereby a countercurrent flow of the gaseous fluid is maintained through the moisture accumulating chamber.

4. A moisture separator as set forth in claim 1 wherein the upper portion of the wall which surrounds the means forming the island is provided with outwardly extending ends to form a trough for the moisture accumulated on the outer surface of the wall.

5. A moisture separator as set forth in claim 4 including means outside of the lower portion of the wall forming a trough, and a drain therein to discharge the moisture from the housing.

6. A moisture separator as set forth in claim 1 wherein the portion of the means forming the island immediately upstream of the outlet curves outwardly.

7. A moisture separator comprising a housing through which a moisture-laden, gaseous fluid stream flows, a body accommodated in the housing, a wall within the housing and surrounding the body, said wall cooperating with the outer surface of the body to define a flow passage for the fluid therethrough, means for imparting a swirling motion to the fluid stream at the upstream end of said flow passage, whereby the moisture is displaced outwardly by centrifugal force, moisture accumulating space defined outwardly of said wall, means defining a passage through said body for a countercurrent flow of fluid in an upstream direction, said passage having an inlet at the downstream end of the body and an outlet at the upstream end of the body, whereby the countercurrent stream of fluid carries moisture particles formed on the surface of the body from the downstream end to the upstream end thereof, and means defining a surface adjacent the upstream side of the outlet, said surface terminating in an edge which extends outwardly of the surface of the body downstream thereof, so that moisture formed on the upstream end of the body will be released from the edge of the surface into the flow passage and the fluid flowing through the flow passage will not enter the said outlet.

8. A moisture separator as set forth in claim 7 including means for straightening out the swirling stream after the moisture has been separated therefrom.

9. A moisture separator comprising means defining a path of flow for a gaseous fluid stream, a housing, an island accommodated within said housing, means defining a moisture accumulating chamber surrounding the island, an annular passage defined between the outer surface of the island and the inner surface of the moisture accumulating chamber, means at the upstream end of said island for imparting a swirling motion to the gaseous fluid stream and the moisture carried thereby as it moves through the annular passage between the outer surface of the island and the moisture accumulating chamber, whereby the moisture is impelled outwardly by centrifugal force to the moisture accumulating means, thereby separating the moisture from the gaseous fluid stream, means defining a passage through said island for a countercurrent flow of fluid therethrough, means defining an opening in the downstream end of the island connecting the outer surface of the island with the passage through the island, means defining a gap at the upstream end of the island through which the countercurrent flow of fluid emerges in an outwardly direction, thereby carrying moisture particles formed on the upstream end of the island to the moisture accumulating means, and means defining a surface of the island adjacent and upstream of the gap at the upstream end of the island, said surface terminating in an edge which extends outwardly of the outer surface of the island downstream of the surface, so that moisture formed on the upstream end of the island will be released from the edge into the flow passage and the fluid flowing through the flow passage will not enter the said gap at the upstream end of the island.

10. A moisture separator comprising a housing having inlet and outlet passages for a gaseous fluid stream, a moisture forming filter downstream of the inlet passage on which droplets of moisture are formed as the gaseous fluid stream passes through the filter, an array of vanes mounted within the housing downstream of the filter for imparting a swirling motion to the gaseous fluid and any droplets carried thereby, a pair of concentric cylindrical walls downstream of the array of vanes defining an annular passage therebetween, a moisture accumulating chamber defined within the housing outside said outer cylindrical wall, means forming an inlet to the moisture accumulating chamber from the annular passage, whereby the droplets of moisture are moved by centrifugal force onto the inner surface of the outer cylindrical wall and ultimately into said accumulating passage, thereby separating the moisture from the gaseous fluid stream before the gaseous fluid stream flows through said outlet passage, means defining a passage within the inner cylindrical wall for a countercurrent flow of fluid therethrough in an upstream direction, means defining an opening in the downstream end of the inner cylindrical wall to admit the moisture flowing along the outer surface of said inner cylindrical wall in a downstream direction into the passage within the inner cylindrical wall, whereby the countercurrent stream of fluid carries moisture particles from the downstream surface of the inner cylindrical wall in an upstream direction, and means defining an opening in the inner cylindrical wall at the upstream end thereof to introduce the countercurrent stream of fluid into the upstream end of the annular passage defined between the concentric cylindrical walls, said opening in the inner cylindrical wall at the upstream end being defined in part by an outwardly turned edge so that moisture formed on the upstream end of the inner cylindrical wall will be returned to the flow passage between the inner and outer cylindrical walls.

References Cited in the file of this patent

UNITED STATES PATENTS

| | | |
|---|---|---|
| 2,487,633 | Breslove | Nov. 8, 1949 |
| 2,569,909 | Umney | Oct. 2, 1951 |
| 2,648,397 | Ravese et al. | Aug. 11, 1953 |
| 2,661,076 | Walker | Dec. 1, 1953 |
| 2,664,966 | Moore | Jan. 5, 1954 |

FOREIGN PATENTS

| | | |
|---|---|---|
| 468,487 | Canada | Oct. 3, 1950 |
| 711,304 | Great Britain | June 30, 1954 |
| 713,930 | Great Britain | Aug. 18, 1954 |